(12) United States Patent
Moon

(10) Patent No.: US 6,418,667 B1
(45) Date of Patent: Jul. 16, 2002

(54) TAILGATE FOLDING DEVICE OF AUTOMOTIVE VEHICLE

(75) Inventor: Kwon-Kee Moon, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/753,249

(22) Filed: Dec. 27, 2000

(30) Foreign Application Priority Data

Aug. 22, 2000 (KR) .............................................. 00-48588

(51) Int. Cl.$^7$ .............................. E05F 15/10; B60J 5/06; B62D 25/00
(52) U.S. Cl. .............................. 49/340; 49/339; 296/56; 296/146.13; 16/DIG. 17
(58) Field of Search .......................... 49/339, 340, 381, 49/502; 16/54, 56, 70, 86 C, 334, DIG. 174; 296/146.7, 146.5, 146.8, 56, 146.13

(56) References Cited

U.S. PATENT DOCUMENTS

| | | | | |
|---|---|---|---|---|
| 2,237,046 A | * | 4/1941 | Breitenwischer | |
| 2,291,412 A | * | 7/1942 | Schonitzer | |
| 3,716,945 A | * | 2/1973 | Cooper et al. | 49/139 |
| 4,688,844 A | * | 8/1987 | Hirose et al. | 296/76 |
| 5,784,968 A | * | 7/1998 | MacDonnell | 105/26.05 |
| 5,823,606 A | * | 10/1998 | Schenk | 296/107.08 |
| 6,007,139 A | * | 12/1999 | Shave | 296/146.8 |
| 6,068,327 A | * | 5/2000 | Junginger | 296/146.13 |
| 6,120,081 A | * | 9/2000 | Collins | 296/61 |
| 6,234,563 B1 | * | 5/2001 | Bascou | 296/146.8 |
| 6,270,144 B1 | * | 8/2001 | Schenk | 296/107.08 |

* cited by examiner

Primary Examiner—Curtis Cohen
(74) Attorney, Agent, or Firm—Christie, Parker & Hale, LLP

(57) ABSTRACT

A tailgate folding device for an automotive vehicle constructed to vertically fold a midsection of the tailgate and thereby to avoid an external lower end thereof from touching a ceiling when the tailgate is opened at a place where the ceiling is low, thus promoting an effective use of the tailgate even at a confined area. The device has a tailgate vertically foldable and dividable via a hinge point into an upper portion and a lower portion thereof, a manipulating unit mounted at a folded site of the tailgate to control folding of the tailgate, and a locking unit for adequately converting a relative rotation of the divided tailgate from a restricted state to a released state according to the operation of the manipulating unit.

13 Claims, 2 Drawing Sheets

TAILGATE FOLDING DEVICE OF AUTOMOTIVE VEHICLE

CROSS-REFERENCE TO RELATED APPLICATION

This application claims priority of Korea patent Application No. 2000-48588, filed on Aug. 22, 2000.

BACKGROUND OF THE INVENTION

1. Field of the Invention

The present invention relates to a tailgate folding device of an automotive vehicle, and more particularly to a tailgate folding device of an automotive vehicle adapted to make a lift-up tailgate foldable, thereby allowing the tailgate to be freely opened at a place having a low ceiling.

2. Description of the Prior Art

In general, vehicles are equipped with doors for passengers and cargoes but a lift-up type tailgate is mounted to a vehicle of hatchback style as a rear door for mainly loading and unloading cargoes or merchandises.

In other words, as illustrated in FIG. 1, a tailgate 10 according to the prior art is vertically lifted to be opened via a hinge point (H) mounted at a site where a roof panel 12 joins. When the tailgate 10 is opened, a gas lifter 16 disposed between a quarter panel 14 and the tailgate 10 is elongated to securely prop the opened tailgate 10.

However, there is a problem when the tailgate is opened and lifted up according to the prior art thus described in that, when the tailgate 10 is lifted up and opened at a place where a ceiling (C) is low, an external lower end of the tailgate 10 reaches the low ceiling (C), resulting in damages thereto.

SUMMARY OF THE INVENTION

The present invention is disclosed to solve the aforementioned problems and it is an object of the present invention to provide a tailgate folding device of an automotive vehicle constructed to vertically fold a midsection of the tailgate and thereby to avoid an external lower end thereof from touching a ceiling when the tailgate is opened at a place where the ceiling is low, promoting an effective use of the tailgate even at a confined area.

In accordance with the object of the present invention, there is provided a tailgate folding device of automotive vehicle, the device comprising:

a tailgate vertically foldable and dividable via a hinge point into an upper portion and a lower portion thereof;

a manipulating unit mounted at a folded site of the tailgate to control folding of the tailgate; and a locking unit for adequately converting a relative rotation of the divided tailgate from a restricted state to a released state according to operation of the manipulating unit.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF AN EXEMPLARY EMBODIMENT OF THE INVENTION

Now, an exemplary preferred embodiment of the present invention will be described in detail with reference to the accompanying drawings.

Figure 1:
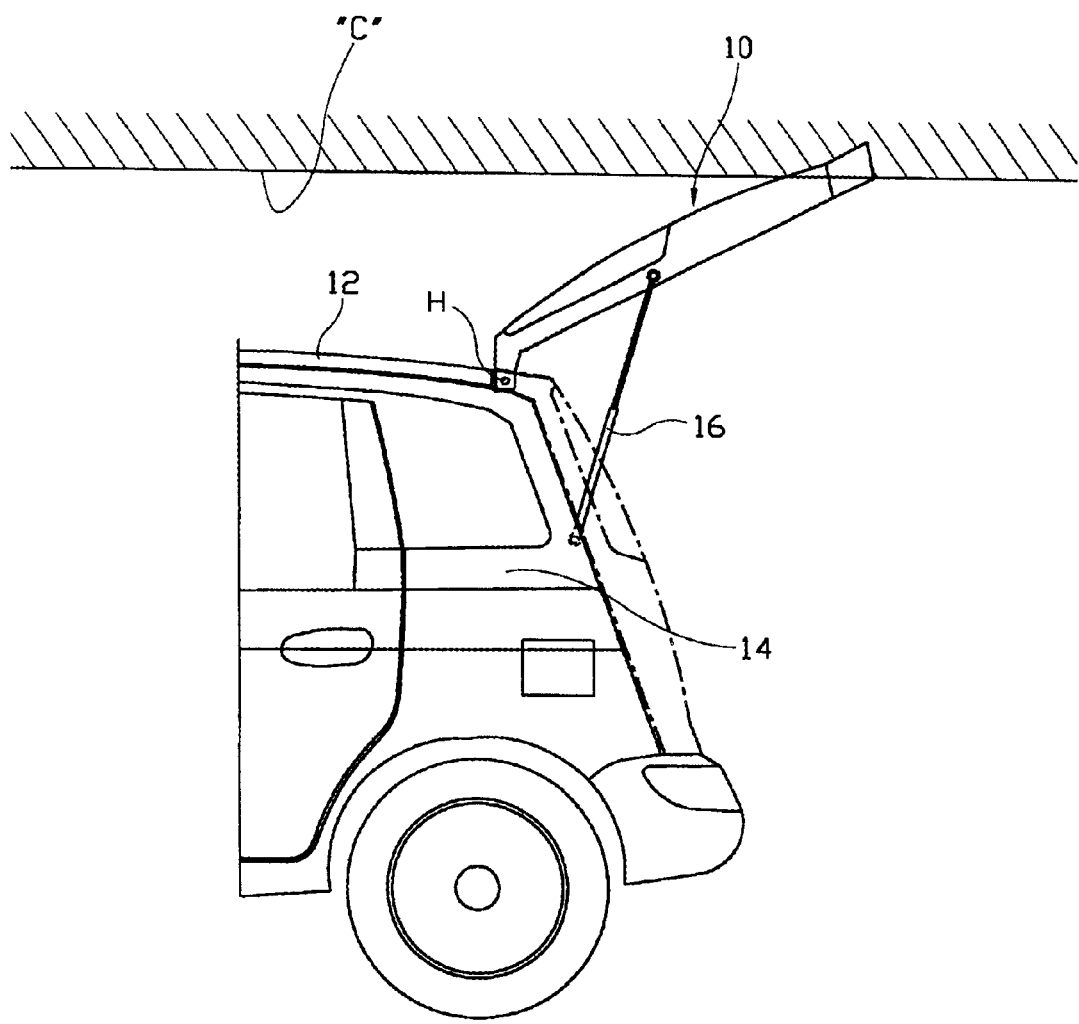
FIG. 1 is a partial side view for illustrating an opened state of tailgate according to the prior art.
Figure 2:
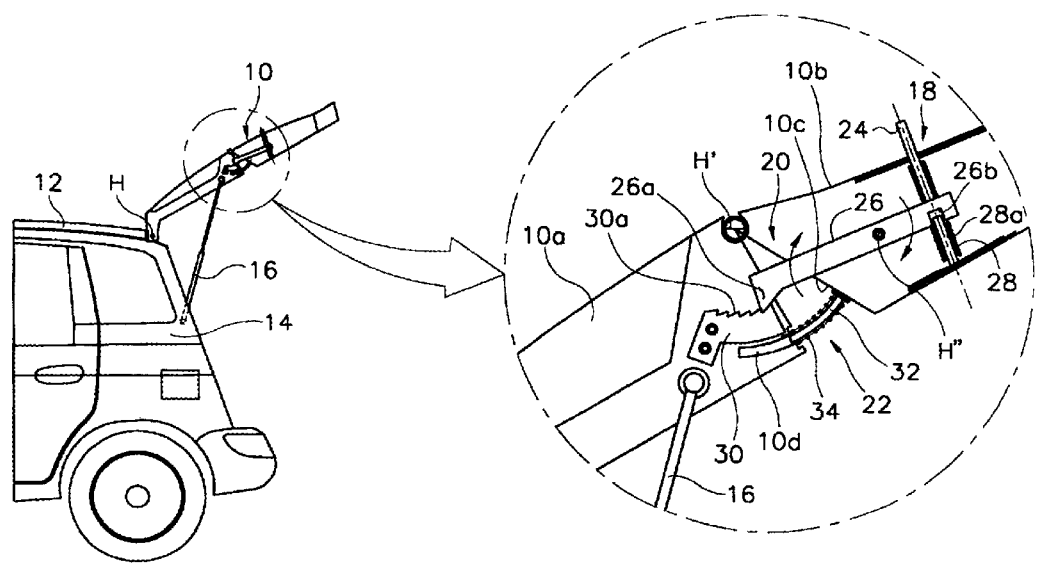
FIG. 2 is a partial side view for illustrating a normally opened tailgate according to the present invention.
Figure 3:
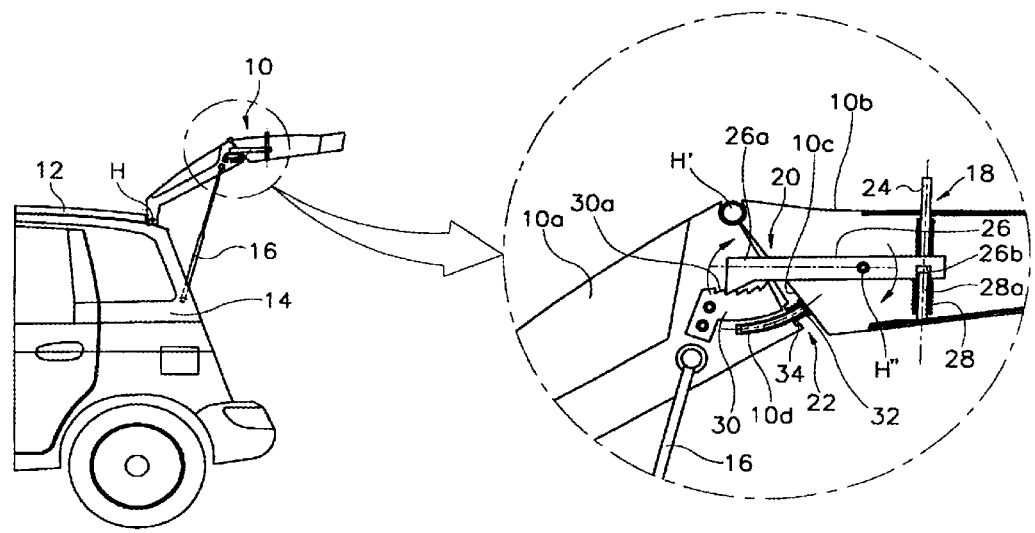
FIG. 3 is a partial side view for illustrating a tailgate opened in foldable method according to the present invention.

FIG. 2 is a partial side view for illustrating a normally opened tailgate according to the present invention and FIG. 3 is a partial side view for illustrating a tailgate opened in a foldable method according to the present invention.

As illustrated in the drawings, a tailgate 10 lifted up and opened according to the present invention is rotatably mounted via a hinge point (H) at a place adjacent to a roof panel 12, and is securely propped up via a quarter panel 14 and a gas lifter 16 when the tailgate 10 is opened.

Furthermore, the tailgate 10 is divided at an approximate midsection thereof via a hinge point (H') into a relatively rotatable upper gate member 10a and a lower gate member 10b, where the upper gate member 10a is rotably mounted on a roof panel 12 via a hinge point (H) while the lower gate member 10b is rotatably mounted at the upper gate member 10a via the hinge point (H').

At this location, the lower gate member 10b is formed thereon with a partially-cut inclination 10c in order to avoid an interference with the upper gate member 10a when the lower gate member 10b is relatably rotated relative to the upper gate member 10a via the hinge point (H'). Furthermore, the tailgate 10 having the upper gate member 10a rotatably mounted via the hinge point (H') and the lower gate member 10b further includes a manipulating unit 18 for controlling the foldedness of the tailgate 10 on a folding point and a locking unit 20 for appropriately converting the relative rotation of the vertically divided tailgate 10 from restricted state to release state according to operation of the manipulating unit 18.

Meanwhile, the tailgate 10 divided into an upper portion and a lower portion is additionally formed at the folding site thereof with a guide unit 22 for guiding the lower gate member 10b when the lower gate member 10b is rotated to fold relative to the upper gate member 10a. The guide unit 22 serves to appropriately guide the lower gate member 10b when the lower gate member 10b is rotated via the hinge point (H') relative to the upper gate member 10a, thereby maintaining the rotation of the lower gate member 10b relative to the upper gate member 10a at a normal state.

At this time, a manipulating unit 18 includes a movable rod 24 so mounted as to move inwardly on the lower gate member 10b and exposed at one side thereof, a hitching rod 26 pressed by the movable rod 24 to rotate via a hinge point (H"), and a fixation rod 28a peripherally mounted with a first restoring spring 28 for resiliently supporting the hitching rod 26 at a lower portion of the hitching rod 26 and for resiliently supporting the movable rod 24 at the same time.

Furthermore, the locking unit 20 is formed with a latch rod 30 mounted with a gear teeth 30a meshing with the hitching rod 26 of the manipulating unit 18 and secured at the upper gate member 10a. Meanwhile, the hitching rod 26 is integrally formed at one tip end thereof with a protruder 26a for meshing with the gear teeth 30a of the latch rod 30 and is also integrally mounted at the other tip end thereof with a groove 26b for coupling with the fixation rod 28a, where the groove 26b functions to compress the first restoring spring 28 peripherally formed on the fixation rod 28a when the hitching rod 26 is turned.

Still furthermore, the guide unit 22 includes a support rod 32 fixed at one tip end thereof to the lower gate member 10b and resiliently accommodated at the other tip end thereof into the upper gate member 10a, and a second restoring spring 34 for being inserted into a peripheral surface of the support rod 32 and for being supportively contacted by both ends thereof between the upper gate member 10a and the lower gate member 10b.

Meanwhile, the upper gate member 10a is formed with a predetermined size of accommodating space 10d for accepting the support rod 32, where the accommodating space 10d serves to accept the support rod 32 when the lower gate member 10b is turned to fold relative to the upper gate member 10a via the hinge point (H').

At this time, the guide unit 22 adequately guides the lower gate member 10b when the lower gate member 10b is rotated about the hinge point (H') relative to the upper gate member 10a, thereby maintaining the rotation of the lower gate member 10b relative to the upper gate member 10a at a normal state. The guide unit 22 also adequately slows the rotary speed of the lower gate member 10b via resilience of the second restoring spring 34, functioning as a damper for prevention of abrupt contact with the upper gate member 10a.

The support rod 32 and the accommodating space 10d are respectively formed of a curvaceous fashion, by which a smooth coupling between the support rod 32 and the accommodating space 10d is realized when the lower gate member 10b is rotated about the hinge point (H') to fold relative to the upper gate member 10a.

Now, operation of the present invention is explained.

When an automotive vehicle equipped with tailgate 10 is parked and the tailgate 10 is opened at a place where ceiling is low, where the tailgate 10 is opened to a certain degree and the movable rod 24 at the manipulating unit 18 exposed externally to the lower gate member 10b is pressed. The hitching rod 26 is then turned about the hinge point (H") to release meshedness with the latch rod 30 of the locking unit 20.

Successively, the lower gate member 10b is rotated and folded upto a predetermined angle about the hinge point (H') relative to the upper gate member 10a according to its own weight, where, the movable rod 24 is lifted by restoring force of the first restoring spring 28 when manipulating force applied to the movable rod 24 of the manipulating unit 18 is released.

The hitching rod 26 is rotated about the hinge point (H") in the reverse direction to be meshed into the latch rod 30 of the locking unit 20 to maintain the folded state of the lower gate member 10b relative to the upper gate member 10a.

Meanwhile, when the lower gate member 10b is rotated to fold about the hinge point (H') relative to the upper gate member 10a, the support rod 32 of the guide unit 22 secured at the lower gate member 10b is accepted into the accommodating space 10d formed at the upper gate member 10a, such that restriction or guidance is performed to allow an exact rotation according to a certain trace in relation to rotation of the lower gate member 10b.

At this time, the guide unit 22 provides a resisting force via resilience of the second restoring spring 34 to the lower gate member 10b rotating about the hinge point (H') relative to the upper gate member 10a, such that the lower gate member 10b is not abruptly rotated by its own weight.

Furthermore, when the lower gate member 10b at the tailgate 10 is to be restored to its original position, the movable rod 24 at the manipulating unit 18 is again pressed and the lower gate member 10b is slightly lifted to return the lower gate member 10b to its original position.

At this time, the second restoring spring 34 inserted into the support rod 32 of the guide unit 22 is converted to a restored state from a state pressed between the upper gate member 10a and the lower gate member 10b to provide a restoring force to the lower gate member 10b, such that the lower gate member 10b can be smoothly returned to its original normal position via the hinge point (H').

As apparent from the foregoing, there is an advantage in the tailgate folding device of automotive vehicle thus described according to the present invention in that the tailgate opened and closed by way of vertical rotation thereof relative to the body of the automotive vehicle is foldably constructed via the hinge point (H'), such that even if the tailgate 10 is opened at a place where ceiling is low, interference between the ceiling and the external lower portion of the tailgate 10 can be avoided because of the folded tailgate 10, thereby preventing damage to the tailgate 10.

What is claimed is:

1. A tailgate folding device of automotive vehicle, the device comprising:

a tailgate vertically foldable and dividable via a hinge point into an upper gate member and a lower gate member;

a manipulating unit controlling folding of the tailgate;

a locking unit for locking the upper and lower gate members relative to each other according to operation of the manipulating unit;

a support rod fixed to the lower gate member;

a spring between the upper gate member and the lower gate member and surrounding a peripheral surface of the support rod; and a guide unit including an accommodating space formed at the upper gate member for accommodating the support rod.

2. The device as defined in claim 1, wherein the tailgate is divided at an approximate midsection thereof via the hinge point into the upper gate member and the lower gate member, while the lower gate member is formed thereon with a partially-cut inclination in order to avoid an interference with the upper gate member when the lower gate member is rotated relative to the upper gate member via the hinge point to a folded position.

3. The device as defined in claim 1, wherein, the manipulating unit comprises:

a movable rod so mounted as to move inwardly on the lower gate member and exposed at one side thereof;

a hitching rod pressed by the movable rod to rotate via a hitching rod hinge point; and fixation rod peripherally mounted with a second spring for resiliently supporting the hitching rod at a lower portion of the hitching rod and for resiliently supporting the movable rod at the same time.

4. The device as defined in claim 3, wherein the locking unit is formed with a latch having gear teeth meshing with the hitching rod.

5. The device as defined in claim 1, wherein the support rod and the accommodating space are respectively curved allowing for a smooth coupling between the support rod and the accommodating space when the lower gate member is rotated about the hinge point to fold relative to the upper gate member.

6. A folding vehicle tailgate comprising:

a first gate member rotatably coupled to a vehicle;

a second gate member rotatably coupled to the first gate member and rotatable to a plurality of positions relative to the first gate member;

a hitching rod mounted on one of said first and second gate members;

a latch comprising a plurality of teeth mounted on the other of said first and second gate members, wherein the hitching rod can engage any of said teeth for selectively locking the position of the second gate member relative to the first gate member; and a moveable rod coupled to the member onto which is mounted the hitching rod, wherein the hitching rod is pivotally coupled to said one of said first and second gate members and extending beyond said one gate member and wherein the moveable rod moves the hitching rod for selectively engaging the teeth on the latch.

7. A folding vehicle tailgate as recited in claim 6 further comprising a spring for pivoting the hitching rod in a first direction and into engagement with a latch member tooth for locking the position of the first member relative to the second member, wherein movable rod is transverse to the hitching rod, wherein pushing of the moveable rod causes the hitching rod to pivot about a second direction opposite the first direction for disengaging of the hitching rod from latch for allowing relative rotation of the second gate member relative to the first gate member.

8. A folding vehicle gate as recited in claim 7 further comprising:

a support rod extending from one of said first and second gate members; and an opening formed on the other of said first and second gate members for accommodating said support member, wherein the support member slides within the opening as the second gate member rotates relative to the first gate member.

9. A folding vehicle gate as recited in claim 8 wherein the second gate can rotate from a folded position to an unfolded position and wherein the gate further comprises a spring surrounding the support member and surrounding the opening, wherein the spring is sandwiched between the first and second gate members and urges the second gate member toward the unfolded position when the second gate member is in the folded position.

10. A folding vehicle as recited in claim 9 wherein the support member and opening are curved along their length.

11. A folding vehicle tailgate comprising:

a first gate member rotatably coupled to a vehicle;

a second gate member rotatably coupled to the first gate member and rotatable to a plurality of positions relative to the first gate member;

a hitching rod mounted on one of said first and second gate members;

a latch comprising a plurality of teeth mounted on the other of said first and second gate members, wherein the hitching rod can engage any of said teeth for selectively locking the position of the second gate member relative to the first gate member;

a support rod extending from one of said first and second gate members;

a spring surrounding the support rod; and an opening formed on the other of said first and second gate members from which the support rod does not extend for accommodating said support rod, wherein the support rod slides within the opening as the second gate member rotates relative to the first gate member.

12. A folding vehicle gate as recited in claim 11 wherein the second gate can rotate from a folded position to an unfolded position and wherein the spring surrounding the support rod surrounds the opening, wherein the spring is sandwiched between the first and second gate members and urges the second gate member toward the unfolded position when the second gate member is in the folded position.

13. A folding vehicle as recited in claim 12 wherein the support rod and opening are curved along their length.

* * * * *